V. ROSS.
TRANSFER MECHANISM.
APPLICATION FILED APR. 7, 1908.

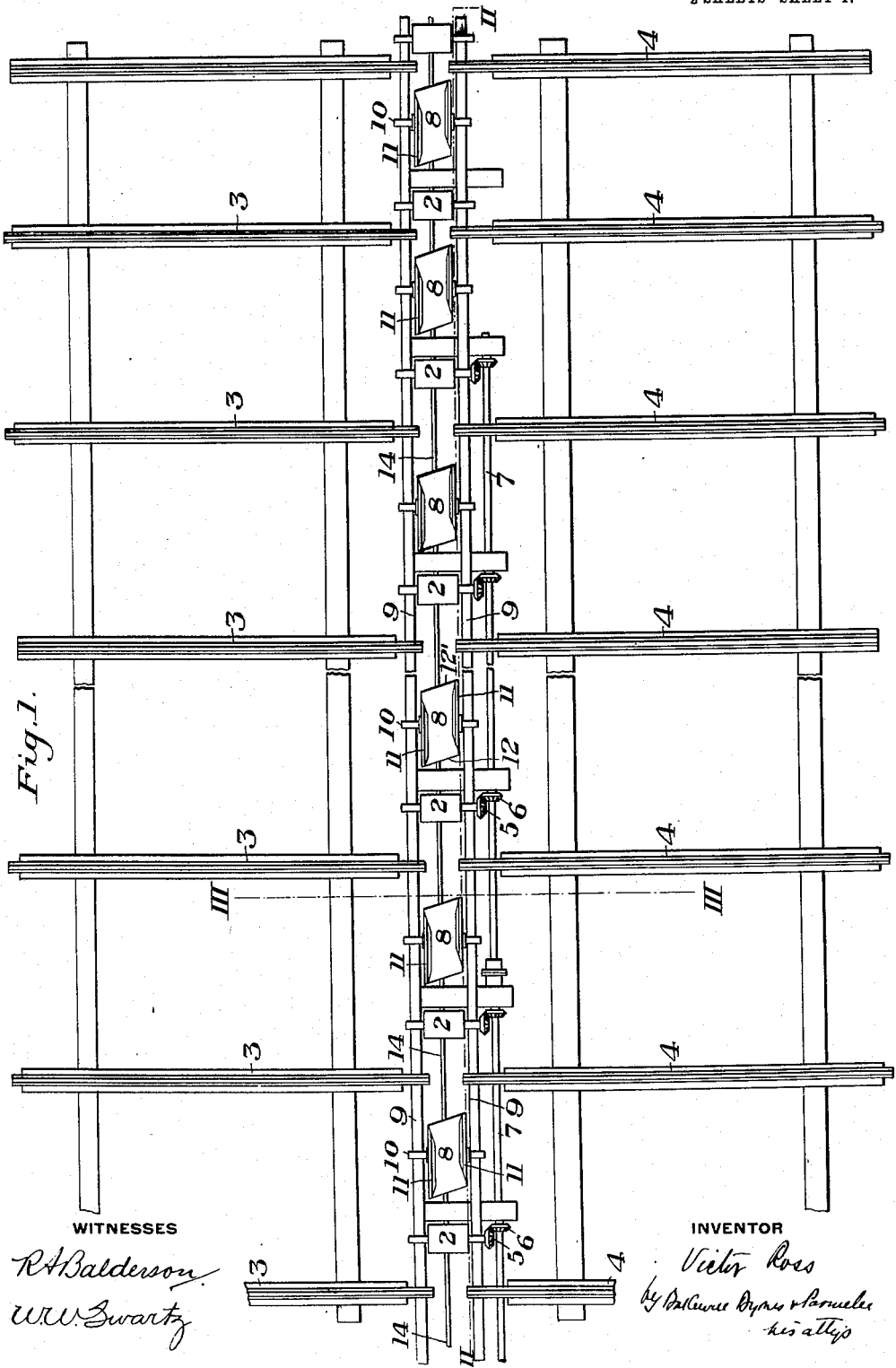

921,165.

Patented May 11, 1909.
2 SHEETS—SHEET 2.

WITNESSES
R. H. Balderson
W. W. Swartz

INVENTOR
Victor Ross
by Bakewell Byrnes Parmelee
his attys

UNITED STATES PATENT OFFICE.

VICTOR ROSS, OF DUQUESNE, PENNSYLVANIA.

TRANSFER MECHANISM.

No. 921,165.　　　　Specification of Letters Patent.　　Patented May 11, 1909.

Application filed April 7, 1908. Serial No. 425,723.

*To all whom it may concern:*

Figure 3:
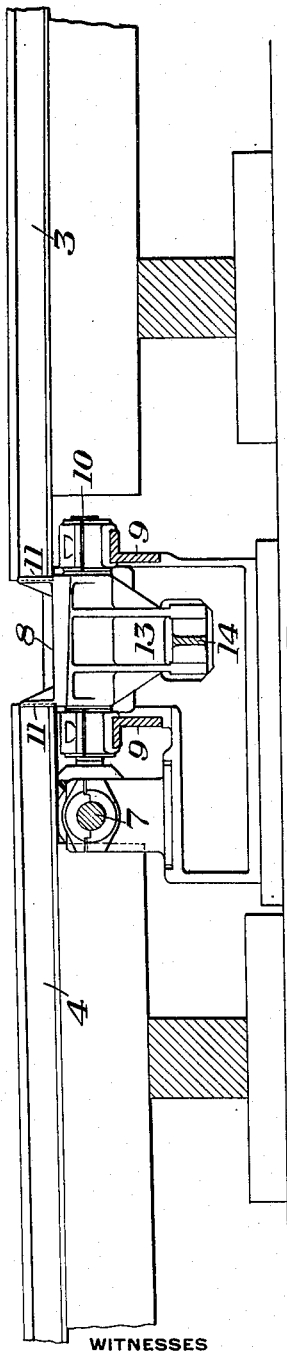
Figure 2:
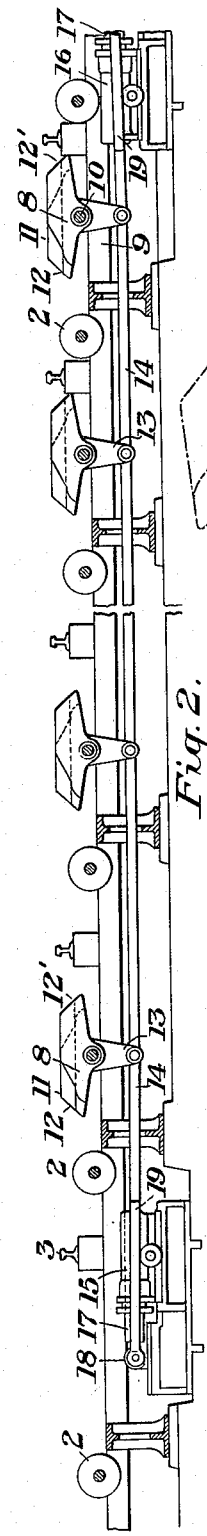
Figure 5:
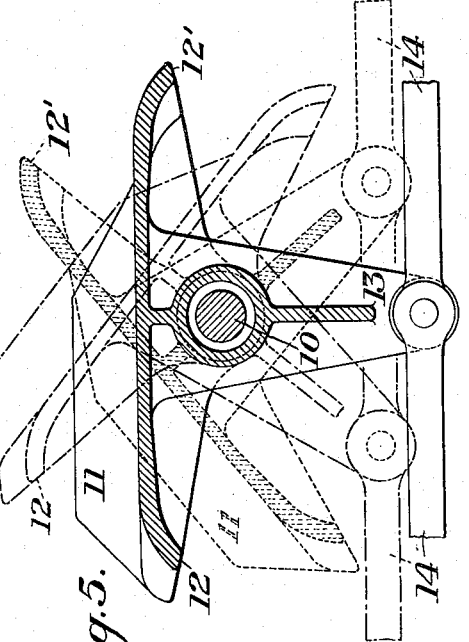
Figure 4:
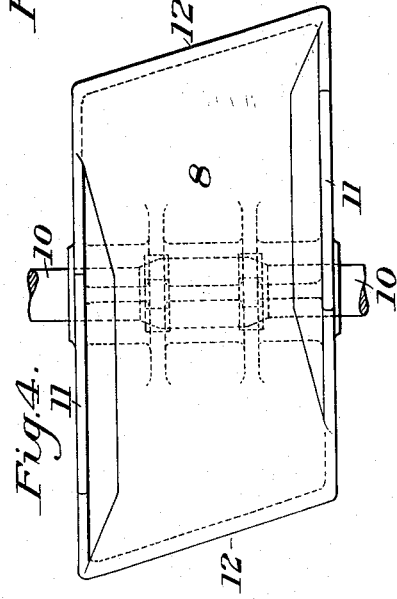

Be it known that I, VICTOR ROSS, of Duquesne, Allegheny county, Pennsylvania, have invented a new and useful Improvement in Transfer Mechanisms, of which the following is a full, clear, and exact description, reference being had to the accompanying drawings, forming part of this specification, in which—
Figure 1 is a plan view showing a roller feed table and hot-bed equipped with my improved apparatus; Fig. 2 is a sectional end elevation of the same on the line II—II of Fig. 1; Fig. 3 is a sectional side elevation on the line III—III of Fig. 1; Fig. 4 is a detail plan view; and Fig. 5 is a sectional side elevation on a larger scale, of one of the tilting apron plates, forming part of my invention, the apron plate being shown in dotted lines in its extreme tilted positions, in Fig. 5.

My invention relates to apparatus employed in handling the products of rolling mills, such as round, flat and square metal bars, or rails, beams, tubes, pipes and other rolled shapes, and the invention more particularly relates to the handling of such material in delivering them from the forming rolls during the rolling operation or after the rolling operation has been completed, to feed tables or to the hot-bed or other place of storage.

The object of the invention is to provide a simple and effective mechanism by which the bars or other materials are delivered, transferred or removed from the rollers of a feed table transversely to the line of feed of the feed table to a parallel feed table or to the skids forming a hot-bed or storage bed.

In the drawings, 2 represents the rollers of a feed table which is located in front of and in line with the pass of a rolling mill or other point of supply for the bars or other articles to be handled. A hot-bed or storage bed formed by the skids 3 and 4 is located on each side of the feed table. Instead of having a storage bed on each side of the feed table, as shown in the drawings, but one such bed may be used, which can be located on either side of the feed table, as is desired. The rollers 2 are positively driven through bevel gears 5 and 6, and the line shaft 7 by means of any desired type of motor (not shown) in the usual manner.

Located between the feed rollers 2 are tilting apron plates 8, which are pivotally mounted on the sides 9 of the feed table, the pivot shafts 10 extending transversely across the width of the feed table with their axes parallel to the axes of the rollers 2. The apron plates 8 are preferably provided on two edges with side guards 11, which extend in lines parallel with the sides 9 of the feed table and project upwardly above the top face of the apron plates and above the level of the top of the rollers 2, to keep the materials in position on the rollers 2 of the feed table while being fed forwardly lengthwise on the table. The other edges 12 and 12' of the apron plates 8 are formed at an angle to the axes of the pivot shaft on the apron plate and as shown, these edges are parallel. Instead of forming both edges 12 and 12' on an angle to the pivotal axis of the apron plate, but one edge may be at such an angle, or the edges 12 12' may be at relatively opposite angles to the axis of the pivot shaft. This latter construction may be found desirable where the hot-bed or feed table is located on one side only of the roller table, and by such construction the metal may be transferred sidewise from the rollers by tilting the apron plates in either direction.

Each of the apron plates 8 is provided with a depending arm 13, which, as shown, is forked at its outer or lower end so as to embrace the ends of the links 14 by which the arms 13 are connected together. At the opposite ends of the feed table are fluid-actuated cylinders 15, 16, each of which is provided with a plunger 17, and cross-heads 18, and the cross-heads 18 are connected by links 19 with the links 14 which connect together the arms 13 on the apron plates 8.

In the operation of my improved transfer mechanism, the bars or other materials are fed forwardly on the rollers 2, of the feed table, until they are opposite the storage bed or the feed tables in position to be transferred sidewise from the rollers 2 to the skids or the feed tables. One of the cylinders 15 is then actuated by means of a suitable fluid-pressure supply, and the plunger 17, through the links 19, 14, and arms 13, rocks or tilts the series of apron plates 8 into one or the other of the positions shown by dotted lines in Fig. 5. As the apron plates are rocked, the beveled or angular edge 12 on these plates lifts the metal from the rollers and when the angle of the edges 12 reaches the angle of repose of the materials being lifted, these materials are caused to slide transversely from the table on to the skids 3, forming the hot-bed, or to the feed table, when such are used. It will be noted by reference to Fig. 5, that the top edge of the side guards 11 are inclined in such manner as to be clear of the path of the bars when the apron plates are in their tilted position to shift the bars transversely from the roller table to the skids forming the hot-bed or to the feed tables. The apron plates are then moved by means of the cylinders 15, 16, and connecting mechanism, into a horizontal position in readiness to receive and guide the next bar or bars while being delivered by the rollers 2. When one bed has been filled with material the apron plates are then tilted in the opposite direction to transfer the materials to the hot-bed located on the opposite side of the roller table. Instead of first filling one hot-bed with material and then filling the hot-bed on the opposite side of the feed table, while the material on the first filled bed is being removed, the apron plates may be tilted in alternately opposite directions, so as to gradually fill both beds at the same time. The bars or other articles may be transferred singly from the roller table by the apron plates or a plurality of bars may be collected on the roller table between the operations of tilting the apron plates when such latter operation is found desirable.

The advantages of my invention are many and will be apparent to those skilled in the art. The apparatus is simple and is easily kept in repair. Instead of the usual stationary apron plates and side guards with the separate independent mechanism for removing material from the feed table, the apron plates are arranged to be rocked or tilted and by the tilting operation to automatically transfer the material from the feed table to the storage or hot-beds, located on each side of the roller feed table.

While the tilting apron plates are shown arranged to transfer materials from a roller feed table to a hot-bed, obviously the apparatus can be used in transferring materials transversely from one roller feed table to another.

Variations in the construction and arrangement of the apparatus may be made without departing from my invention. The side guards may be separate and stationary instead of (as shown) being formed integral with the apron plates. In some cases, the rollers of the feed table may be dispensed with and other means provided for feeding materials forwardly on the apron plates, into position to be transferred transversely by the tilting apron plates and other modifications may be made within the scope of my invention.

I claim:

1. In a transfer mechanism, a longitudinally extending receiving device, in combination with a transferring member tiltably mounted on an axis extending transversely of the receiving device, said member having thereupon ends which traverse the path of the load supported by the receiving device, upon which ends are devices constructed and arranged to permit of and cause discharge of the load transversely from one side of the receiving device when the transferring member is tilted in one direction, and to permit of and cause a similar discharge in the opposite transverse direction when the transferring member is tilted in the other direction, substantially as described.

2. In a transfer mechanism, a receiving device, a tilting member having a transferring portion on each side of the center thereof, and means to tilt the transfer member in either direction to discharge the load in a lateral direction from the receiving device, substantially as described.

3. In a transfer mechanism, a receiving device, a tilting transferring member, means to tilt the transferring member in one direction to raise and discharge the load from the receiving device and means to tilt the transferring member in the reverse direction to raise and discharge the load in an opposite direction, substantially as described.

4. In a transfer mechanism, a receiving device, a tilting transferring member, mounted transversely to the receiving device, means to tilt the transferring member in one direction to raise and discharge the load from the receiving device and means to tilt the transferring member in the reverse direction to raise and discharge the load in an opposite direction, substantially as described.

5. A transfer mechanism comprising a tilting apron plate, and means for tilting said apron plate in opposite directions, said plate having means on each of its ends arranged to raise and move bars and the like transversely across the width of said apron, when the said apron is tilted in either direction, substantially as described.

6. In a transfer mechanism, a receiving device, a tilting apron plate, means on its ends arranged to raise and move bars and the like in a transverse direction across the width of the receiving device when tilted in either direction, and means to tilt the apron plate in either direction to raise and transfer the load in a lateral direction, substantially as described.

7. In a transfer mechanism, a receiving device, a tilting apron plate, having longitudinally extending side guides, means for tilting said apron plate in opposite directions, said plate having means on its end arranged to move bars and the like transversely across the width of the receiving device when tilted, and means to tilt the apron plate to raise and discharge the bars, substantially as described.

8. In a transfer mechanism, a receiving device, a tilting apron plate, means for tilting the apron plate in opposite directions, the plate having means on its ends arranged to move bars transversely in opposite directions across the width of said receiving device when the apron plate is tilted in opposite directions, substantially as described.

9. In a transfer mechanism, a receiving device, an apron plate mounted so as to tilt around an axis which extends transversely to the receiving device, means to tilt the apron plate in opposite directions, the plate having means on its ends arranged to raise and move bars and the like transversely across the width of the receiving device when the apron is tilted in either direction, substantially as described.

10. In a transfer mechanism, a receiving device, tilting apron plates having side guides thereon, means connecting the plates together for tilting them in unison, said plates having means arranged to raise and move bars and the like transversely across the receiving device when said apron plates are tilted in either direction, substantially as described.

11. In a transfer mechanism, a receiving device, a plurality of tilting apron plates connected together, means to tilt said plates in opposite directions, means on the outer ends of each of said plates to move bars across the receiving device when the said plates are tilted in either direction, and means to tilt the plates in either direction, substantially as described.

12. In transfer mechanism a feed roller table, a plurality of tilting apron plates between the rollers of the feed table, means for connecting the plates together, means for tilting the plates in opposite directions, said plates having angular ends arranged to move bars and the like across the feed table when tilted in either direction, and means for tilting the apron plates, substantially as described.

In testimony whereof, I have hereunto set my hand.

VICTOR ROSS.

Witnesses:
 GEORGE L. NEFF,
 T. E. McDOWELL.